Feb. 16, 1954      F. H. NELSON      2,669,596
RESERVE BATTERY ENCLOSURE
Filed March 18, 1953
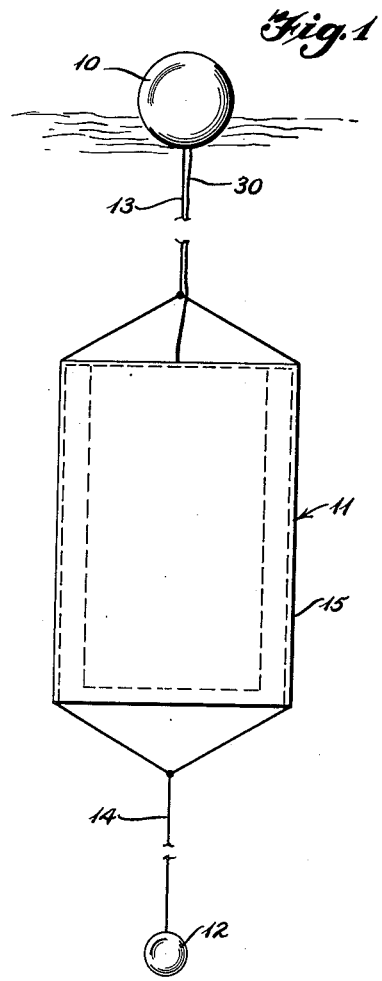
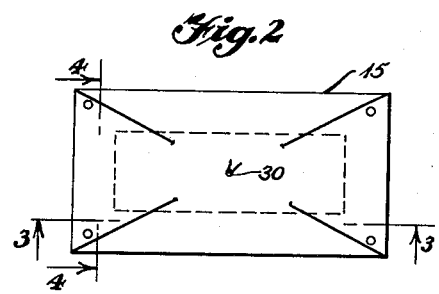
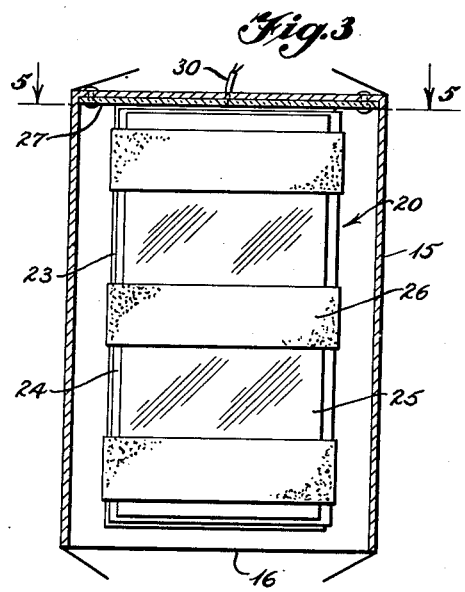
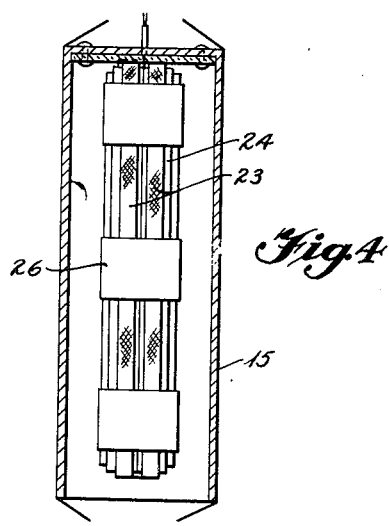
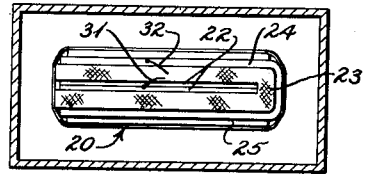
Inventor
Frank H. Nelson Patented Feb. 16, 1954

2,669,596

UNITED STATES PATENT OFFICE 2,669,596

RESERVE BATTERY ENCLOSURE

Frank H. Nelson, Oreland, Pa., assignor, by mesne assignments, to the United States of America as represented by the Secretary of the Navy Application March 18, 1953, Serial No. 343,037

5 Claims. (Cl. 136—91)

This invention relates to electric primary batteries such as are usable in underwater sound detection apparatus.

Sonobuoys and other apparatus used at sea for sound detection are powered with electric batteries each having a dry electrolyte subject to activation on immersion in sea water. A deficiency of this battery is that, on immersion, the sea water not only wets the electrolyte but by its continued presence tends to cause rapid deterioration of the active cell ingredients. The tendency to short circuiting by leakage is also pronounced.

It is the primary purpose of this invention to provide a battery for sea sound detection apparatus which, while permitting activation of the battery electrolyte by sea water, produces a subsequent expulsion of water from the casing so that the life of the battery is definitely prolonged. An additional object is to provide a battery structure which may be readily incorporated in a sonobuoy, spar float or anchor construction. Still another object is to provide a battery usable at will with sound detection equipment but which prior to use has satisfactory shelf life.

Other objects and features of the invention will become apparent on reference to the following description of a preferred embodiment of the invention as illustrated in the accompanying drawings wherein:

Fig. 1 is a schematic view in elevation of the apparatus;

Fig. 2 is a plan view of the battery;

Fig. 3 is an elevational section along lines 3—3 of Fig. 2;

Fig. 4 is a cross sectional view along lines 4—4 of Fig. 2;

Fig. 5 is a sectional view on line 5—5 of Fig. 3.

Referring to Fig. 1 there is disclosed a float 10, a battery 11 and a weight 12, these elements being connected together by cables 13 and 14, the weight serving to maintain the unit in approximately upright position, with the float lying at the water surface. Float 10 and weight 12 may be sonobuoy apparatus, the float being incorporated with a receiver and antenna, in which case the float may normally ride sub-surface. The battery 11 is constructed with an outer casing or shell 15 having the base end 16 open, the casing at the other or top end 17 being fixed to one end of the battery electrode unit 20 so that the casing walls are spaced from the unit. As shown, the casing at the base extends beyond the electrode unit, so that when supported as shown in the figure the casing submergence is greater than that of electrode unit 20.

The electrode unit 20 may be formed of one or more cells the showing of Figs. 2-5 being of a single cell. Two elongated flat positive electrode plates 22 are indicated about which from side to side about the plate edges is folded an absorbent cloth or fabric 23 for holding dry electrolyte. The cloth is retained in place by the negative electrode plate 24, this plate conforming in contour to the cloth and in turn held in place by plastic plates 25 on each side of the battery unit and spaced strips of binding tape 26 extending around the unit. A plastic top strip 27 is fastened to the top end of the battery unit and to the top end of casing to hold the battery firmly in spaced position within the casing 15 as previously mentioned. Electric cable 30, containing conductors 31 and 32 attached respectively to positive and negative electrodes, connect the battery to the float structure.

The battery is initially dry and hence may be stored until ready for use. When attached to the desired equipment such as a sonobuoy, and thrown into the sea, the open spaces of the battery casing are normally air filled. Sinking into the water the air is trapped but at the point of stable depth, forty feet, for example, there is substantial entry of sea water into the lower end of the battery casing, the trapped air being compressed to about one-third of its volume for the depth mentioned. Complete saturation of the electrolyte holding cloth 23 takes place, immersion of not over five percent of the electrode unit length being sufficient to produce saturation. While there is initially some short circuiting due to the sea water, the rapid evolution of gases due to the electrical flow forces the water clear of the electrodes and the battery functions as if under normal conditions of use. The electrolyte wetting is maintained by occasional splashing or by a slow down in gas evolvement.

The usefulness of the construction is thus apparent, in that, in addition to the substantial shelf wear due to the dry electrolyte, when submerged in sea water, the electrodes are first saturated by water and then relieved of water contact through gas formation, thereby insuring a definite prolongation of battery life and maintenance of electrical power. It is apparent also that the apparatus may be applied either to the surface float type of electronic equipment or to equipment that is wholly submerged under the water surface; also, where the battery has sufficient weight, the weight 12 may be eliminated.

It is obvious that modification of the invention may be made and hence it should be understood that within the scope of the appended claims the invention may be practiced otherwise than as specifically described.

What is claimed is:

1. In signal apparatus for marine use, a battery unit comprising an electrode unit with positive and negative electrodes and an intervening absorbent fabric containing a dry electrolyte, and means for restricting flow of water solvent to said electrolyte when the battery is water immersed, said means comprising a casing for said electrode unit having closed top and sides and open bottom, a water float, and means for suspending said casing and enclosed electrode unit from said float with the closed casing top uppermost.

2. The signal apparatus as defined in claim 1, with a weight suspended from said casing to restrain lateral movement of the base end thereof.

3. The signal apparatus as defined in claim 1 with said electrode unit spaced from the casing side walls.

4. In signal apparatus for marine use, a battery adapted for suspension from a float for energizing signal equipment on water immersion, said battery comprising a casing having fluid impervious top and side walls and an open base, means on said top wall for supporting said battery, at least one electrode unit fixedly suspended inside said casing from said casing top at a point providing open spaces between the electrode unit and casing side walls, said electrode unit having a center positive electrode, an absorbent fabric containing dispersed electrolyte substances therein enclosing said positive electrode, a negative electrode enclosing said fabric in part, and support elements for holding said electrodes and fabric in fixed relationship.

5. The battery as defined in claim 4, said positive electrode being shaped as a flat plate, said negative electrode being U-shaped and enclosing said positive electrode, and said fabric conforming in shape to said negative electrode with the end edges thereof exposed for water absorption.

FRANK H. NELSON.

No references cited.